July 30, 1957 F. DUNN 2,800,710
METHOD OF BONDING METAL TO CERAMIC
Filed Feb. 1, 1956
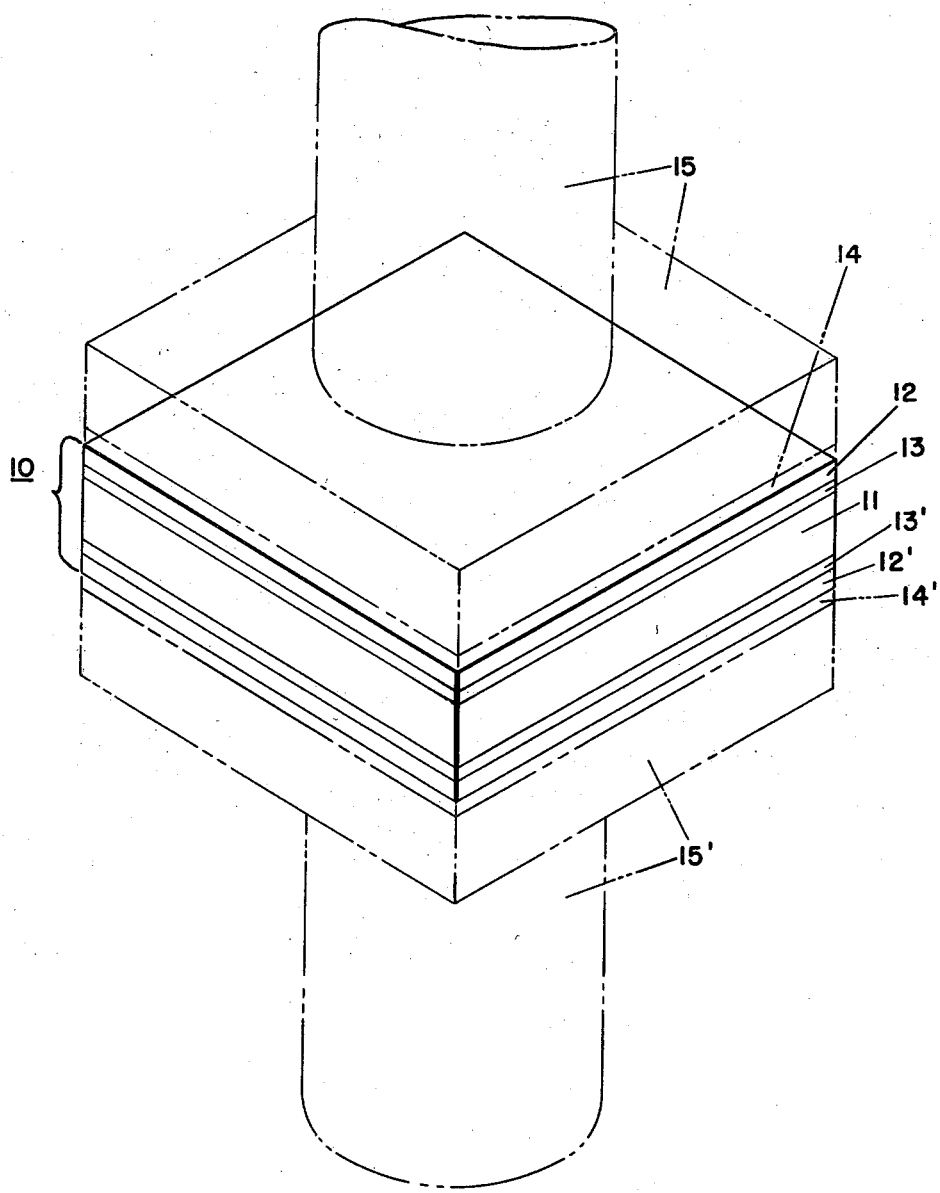
INVENTOR.
FLOYD DUNN
BY
ATTORNEYS United States Patent Office 2,800,710
Patented July 30, 1957

2,800,710

METHOD OF BONDING METAL TO CERAMIC

Floyd Dunn, Urbana, Ill., assignor, by mesne assignments, to the United States of America as represented by the Secretary of the Navy Application February 1, 1956, Serial No. 562,908

2 Claims. (Cl. 29—473.1)

This invention relates to developing a tight bond between metallic and non-metallic refractory material and in particular is concerned with an improved physico-chemical method of bonding metal to a titanate ceramic material.

It has been a problem to join non-metallic refractory members and particularly ceramics to metallic members due to the fact that it has been very difficult to provide a material which will form a satisfactory interface for both the ceramic and metallic members. In accordance with the broader aspect of our invention an interface layer is provided between ceramic and metallic members which adheres equally well to each member and which has the desired bonding properties or mechanical strength. Another aspect of the invention is in selecting chemical compounds which have a chemical affinity for the metal and the ceramic member and applying the compounds to the contacting surfaces of the members to be bonded and treating the assembly under controlled high temperature and inert atmospheric conditions while applying a force uniformly to the contacting surface until the chemical compounds react and the bonding takes effect.

The present method of bonding is applicable to a wide variety of metal to ceramic bonding systems, by the proper choice of chemical compounds, time, pressure and temperature; and the invention finds application, for example, in the manufacture of electrical equipment such as electro-mechanical transducers, or in electronic tubes, wave guides etc.

Further description of the invention which is by way of a detailed example of the invention, is made in connection with the bonding of a barium titanate ceramic member to a silver-palladium alloy member of substantially 60% silver and 40% palladium composition.

Referring to the single figure of the drawing, the numeral 10 generally indicates a metal and ceramic unit which is made up of a barium titanate ceramic member 11 and similar silver-palladium alloy members 12 and 12' all of which are cleansed, selected and properly dimensioned for size and shape in accordance with the desired end product. As shown in the drawing the assembly 10 is a composite of flat laminated members comprising the inner layer of the ceramic and outer layers of the alloy. These are bonded together in a manner now to be described in connection with this particular barium titanate-silver palladium system although the general method is applicable to the bonding of other types of ceramics to other alloys.

The chemical compounds used for the barium titanate-silver palladium system are palladium chloride, titanium oxide, and silver oxide. These compounds are mixed in approximately equal parts of each by weight in water and the palladium chloride which is water soluble and the two oxides which are not water soluble form a mixture which is part solution and part suspension. The mixture is then applied to both surfaces of the barium titanate ceramic member and to one surface each of the silver-palladium alloy members and when sufficient water has been evaporated or otherwise removed, the members are arranged with their treated surfaces in face to face relation as shown in the drawing with the applied mixture forming the interface layers 13 and 13' which is comprised of oxides of the silver and titanate and chloride of the palladium. Thin sheets of cold or copper 14, 14' are then disposed on the exposed or untreated surfaces of the outer or alloy members and a compressing force is applied to the unit 10 by means of clamping jaws 15 and 15' all as shown in phantom lines.

The assembly is placed in a high temperature, high pressure furnace which contains an inert atmosphere or is evacuated and the temperature is raised until reaction occurs and the reaction temperature is maintained until the bonding takes effect and the temperature is then reduced slowly to room temperatures while the compressing force is continued.

The temperatures to which the furnace is raised during the bonding reaction is in the neighborhood of 900° C. and the pressure is of the order of 1000 p. s. i. while the bonding reaction is maintained or continued for about 30 minutes before the temperature is lowered. The gold or copper sheet of metal under these temperature conditions, flows and has the effect of equalizing the pressure distribution over the surfaces which are to be bonded.

By way of explanation of the bonding reaction, the silver oxide begins to decompose at approximately 150° C. giving off oxygen and leaving free silver, while the palladium chloride begins to decompose at approximately 600° C. giving off chlorine and leaving free palladium and the titanium oxide remains stable in this higher temperature region. Further heating to about 900° C. together with the combined application of the compressing force throughout the operation causes the free metals and the titanium oxide to form a rather hard interface material which adheres to both the silver-palladium alloy member and to the barium titanate ceramic member. The depth of penetration of the interface in each member is of the order of a few microns so that neither member is polluted or adversely affected.

Obviously many modifications and variations of the present invention are possible in the light of the above teachings. It is therefore to be understood that within the scope of the appended claims the invention may be practiced otherwise than as specifically described.

What is claimed is:

1. The method of bonding a barium titanate ceramic member to a silver-palladium alloy member which comprises applying a powdered mixture of substantially equal parts of oxide of silver, oxide of titanium and chloride of palladium to surfaces of the members which are positioned in contacting relation and applying a pressure of substantially 1000 p. s. i. at a temperature of substantially 900° C. for approximately one half hour to cause the powdered mixture to react and form a joint between the members.

2. The method of bonding a barium titanate ceramic member to a silver-palladium alloy member to provide a composite body which comprises applying a powdered mixture of substantially equal parts of oxide of silver, oxide of titanium and chloride of palladium to surfaces of the members which are positioned in contacting relation, applying a pressure of substantially 1000 p. s. i. at a temperature of substantially 900° C. for approximately one half hour and maintaining the pressure while the temperature is slowly reduced to substantially room temperature.

References Cited in the file of this patent

UNITED STATES PATENTS

| 2,509,909 | Davis | May 30, 1950 |
|---|---|---|
| 2,570,248 | Kelley | Oct. 9, 1951 |
| 2,647,070 | Litton | July 28, 1953 |